(12) United States Patent
Chen et al.

(10) Patent No.: US 8,479,377 B2
(45) Date of Patent: Jul. 9, 2013

(54) METHODS AND APPARATUS FOR A MOTOR STATOR

(75) Inventors: Chih-Chang Chen, Rochester Hills, MI (US); Michael J. Bland, Clarkston, MI (US); Stephen R. Smith, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 636 days.

(21) Appl. No.: 12/550,077

(22) Filed: Aug. 28, 2009

(65) Prior Publication Data
US 2010/0102664 A1 Apr. 29, 2010

Related U.S. Application Data

(60) Provisional application No. 61/108,176, filed on Oct. 24, 2008.

(51) Int. Cl.
*H02K 5/00* (2006.01)
(52) U.S. Cl.
USPC ............... 29/596; 29/605; 29/732; 310/201; 228/111

(58) Field of Classification Search
USPC .............. 29/596–598; 228/111; 310/179
See application file for complete search history.

(56) References Cited

U.S. PATENT DOCUMENTS

| | | | | |
|---|---|---|---|---|
| 5,745,977 A | * | 5/1998 | Ichikawa et al. | 29/598 |
| 6,339,871 B1 | * | 1/2002 | Maesoba et al. | 29/596 |
| 6,388,358 B1 | * | 5/2002 | Umeda et al. | 310/201 |
| 6,490,779 B1 | * | 12/2002 | Tokizawa et al. | 29/596 |
| 6,698,083 B2 | * | 3/2004 | Tokizawa et al. | 29/596 |
| 6,700,282 B2 | * | 3/2004 | Mori et al. | 310/208 |
| 6,971,153 B2 | * | 12/2005 | Tokizawa et al. | 29/596 |
| 7,293,342 B2 | * | 11/2007 | Kato | 29/596 |

* cited by examiner

*Primary Examiner* — Minh Trinh
(74) *Attorney, Agent, or Firm* — Ingrassia Fisher & Lorenz, P.C.

(57) ABSTRACT

A method of joining the ends of wire windings for a motor stator or the like includes preparing a surface at each end (e.g., by removing any enamel coating), deforming the surfaces to produce knurls, striations, and the like, and then ultrasonically bonding the two surfaces to produce the bond between windings, thereby providing a joint with improved strength.

8 Claims, 2 Drawing Sheets

METHODS AND APPARATUS FOR A MOTOR STATOR

CROSS-REFERENCE TO RELATED APPLICATION

This application claims priority to U.S. Provisional Patent App. No. 61/108,176, filed Oct. 24, 2008.

TECHNICAL FIELD

The present invention generally relates to electrical machines such as electrical motors, and more specifically relates to joining methods used in the manufacture of such components.

BACKGROUND

Hybrid and electric cars often employ electrical traction motors which, as with conventional motors, generally include a stator and a rotor. The stator is typically stationary, and the rotor rotates relative to the stator. In alternating current ("AC") motors, the stator contains a current carrying component generating a magnetic field to interact with the rotor.

Certain high power electrical motors (as shown in FIG. 1) can include a large number of weld joints between copper wire windings. The copper wire windings are conventionally joined by fusion welding processes, such as metal inert gas (MIG) welding, plasma arc welding (PAW), or laser welding. By its very nature the MIG welding process requires time to melt the highly conductive copper and, as a consequence, can cause potential heat damage to the adjacent insulating enamel coating on the copper wires. Spatters and sensitivity to fit-up and alignment between the copper wires are also common drawbacks. PAW may not require filler wire, so spattering is not a problem; however, it still has many of drawbacks as the MIG process. Further, laser welding is sensitive to fit up and alignment and costly for both equipment and operation.

Accordingly, it is desirable to provide improved methods of forming joints between copper wire windings and the like. Furthermore, other desirable features and characteristics of the present invention will become apparent from the subsequent detailed description and the appended claims, taken in conjunction with the accompanying drawings and the foregoing technical field and background.

DETAILED DESCRIPTION

The present invention generally relates to improved methods of forming ultrasonic welds in electrical motor components. In this regard, the following detailed description is merely illustrative in nature and is not intended to limit the invention or the application and uses of the invention. Furthermore, there is no intention to be bound by any express or implied theory presented in the preceding technical field, background, brief summary or the following detailed description. For the sake of brevity, conventional techniques related to welding and the structure and operation of electrical motors are not described herein. Many alternative or additional functional relationships or physical connections may be present in a practical embodiment.

In general, the present invention provides a method for joining the ends of wire windings for a motor stator or the like by preparing a surface at each end (e.g., by removing any enamel coating), deforming the prepared surfaces to produce knurls, striations, or any other three-dimensional features, and then ultrasonically bonding the two surfaces to produce an improved bond between windings. Because the resulting three-dimensional features are significantly larger than the weld depth of typical ultrasonic welds, the resulting joint strength is improved, particularly with respect to opening mode stress conditions.

Figure 1:
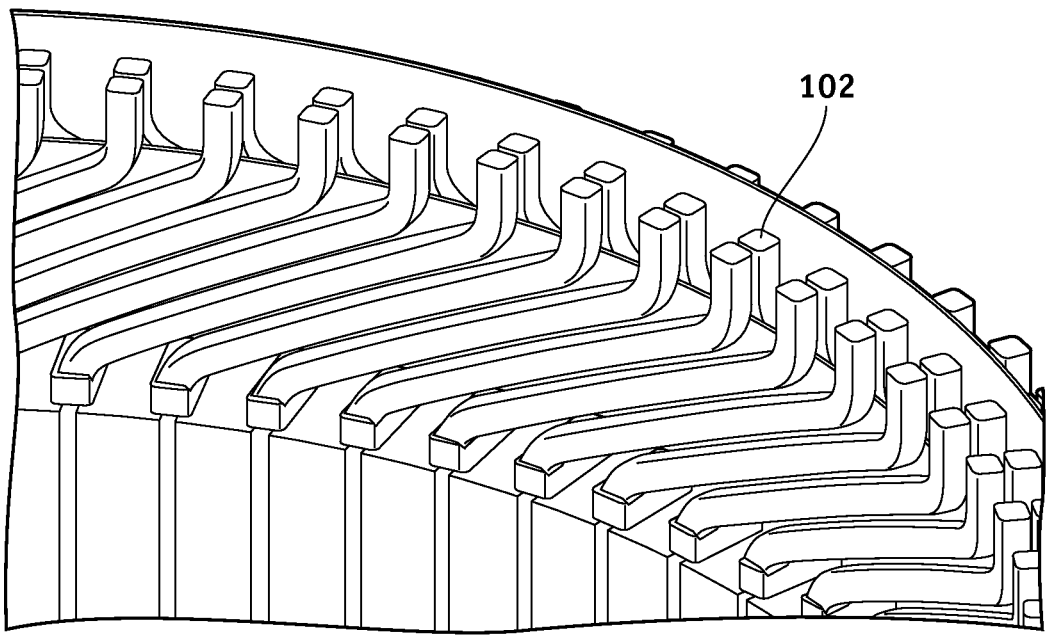
FIG. 1 is an illustration of an electrical motor stator with copper wire windings in accordance with one embodiment.
Figure 2:
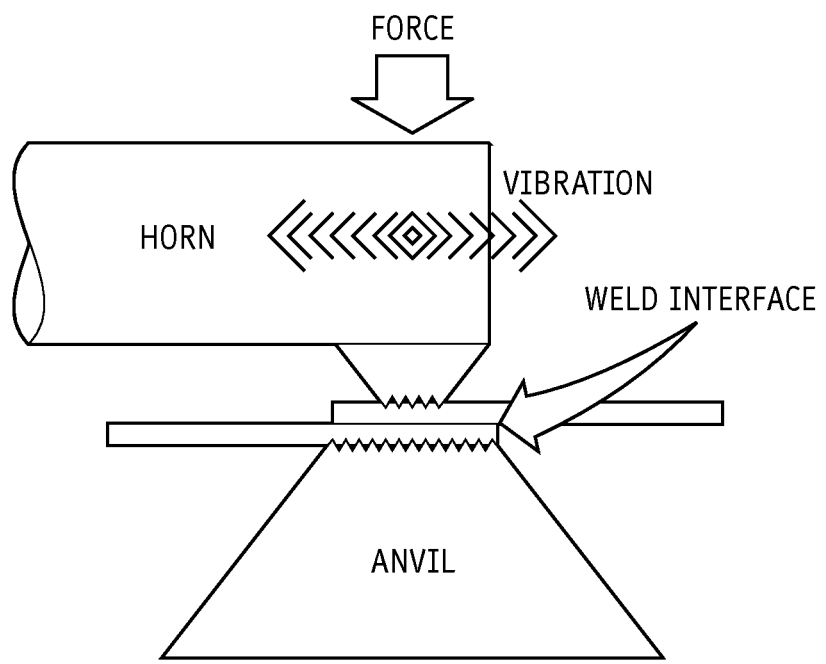
FIG. 2 is a schematic of ultrasonic welding tooling and parts.

As is known in the art, ultrasonic welding, as depicted in FIG. 2, is a solid-state welding process in which a thin layer of solid-state bond is generated at the faying (joined) surfaces of the work pieces by application of force along with high frequency vibratory energy. Compared with the MIG welding process mentioned earlier, ultrasonic welding is relatively quick, "cold," and "clean." Furthermore, it works well with soft material such as copper and does not require consumables. Additionally, it is not sensitive to alignment conditions.

Figure 3:
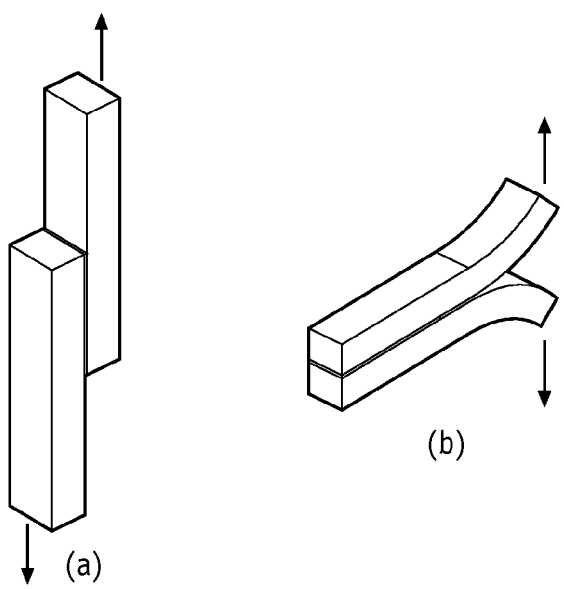
FIG. 3 depicts schematics of ultrasonic weld joint between two solid copper wires under different load conditions.

While ultrasonic welding is an advantageous process for joining copper wires for mass production of electrical motors, one issue arises when heavy copper wires (e.g., wires having a 3 mm×4 mm cross section) are joined by an ultrasonic welding process. In particular, the resulting ultrasonic weld joint will typically exhibit an adequate shear strength (FIG. 3(a)) but an inadequate strength in an opening mode (FIG. 3(b). This is because, under an opening mode load, the stress, instead of being distributed to the entire joint area, is concentrated on the tip of the "notch" between the two copper wires.

Figure 4:
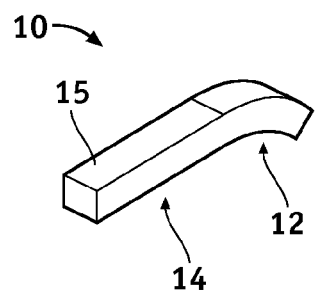
FIGS. 4-6 depicts schematics of copper wire faying surface conditions for ultrasonic welding.
Figure 5:
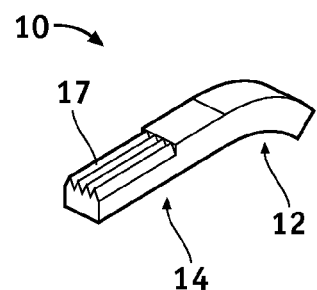
Figure 6:
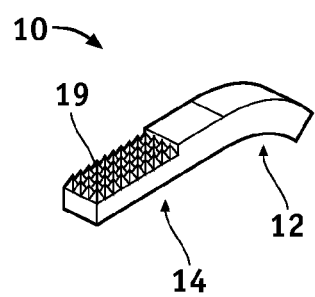
Figure 7:
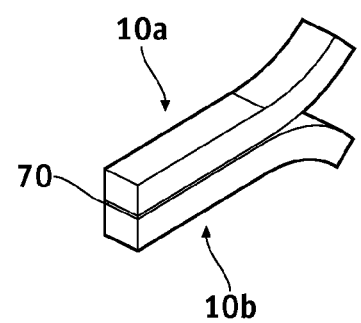
FIG. 7 depicts the bonding of two wire winding ends in accordance with the present invention.

In accordance with the present invention, the strength of the ultrasonic weld joint between heavy gage copper wires under such an open mode load is improved. Referring to FIGS. 4-6, methods in accordance with the present invention deliberately create striations or knurled marks on the faying surfaces (i.e., surfaces to be bonded) prior to ultrasonic welding. With such a faying surface preparation, the ultrasonic weld strength can be improved in a number of ways.

FIG. 4 depicts the end of a wire winding 10. A substantially planar surface 15 has been exposed, as shown, by removing any enamel or other insulating layer 12 that might be present on the wire 10. Insulating layer 12 may be removed chemically, mechanically, or through any suitable process.

FIGS. 5 and 6 show that three-dimensional features have been formed on the exposed surface via a deformation process. For example, in FIG. 5, a series of generally "V"-shaped striations are formed in parallel along the axis of the wire. In FIG. 6, the three-dimensional features comprise a number of knurls—i.e., projecting structures such as pyramids or the like. These knurled and striated surfaces are presented as examples, and are not intended to be limiting.

The deformation process used to produce the three-dimensional features described above may be selected from a number of known manufacturing techniques, including, for example, abrasion or scraping processes, stamping processes, and the like.

The depth and physical size of the striations or knurled marks is, for example, about a fraction of millimeter, which is much greater than the thickness of the solid state bond (which is generally in the range of microns). Therefore, the total contact area of solid state bond is increased multiple times in the presence of such features. With a wavy or uneven surface such as that produced, the path by which the joint is "opened up" by the opening mode loading becomes more tortuous and, therefore, more resistant to failure.

Further, ultrasonic welding of the striations and knurled marks produces bonding on the facets that do not lie on the same plane of the notch between the two wires under opening mode loading. Therefore, the more desirable shear strength becomes available, which increases the overall joint strength. The mechanical interlocking created is not only at the level of solid state bond but potentially at the greater physical dimension of striations and knurled marks. In this way, the strength of the connection is increased.

The material, size, and cross-sectional shape of the wire winding 10 may vary, but in various embodiments is a relatively heavy copper wire—e.g., having a rectangular cross-section measuring one or more millimeters on each side. Furthermore, it will be appreciated that the methods described above may be used for bonding a variety of wire types or dissimilar joints such as wire/plate combinations, not just wire windings used in connection with motors and the like.

It should be appreciated that the example embodiment or embodiments described herein are not intended to limit the scope, applicability, or configuration of the invention in any way. In general, the foregoing detailed description will provide those skilled in the art with a convenient and edifying road map for implementing the described embodiment or embodiments. It should be understood that various changes can be made in the function and arrangement of elements without departing from the scope of the invention.

What is claimed is:

1. A method of making a motor stator, comprising:
    providing a stator body having a plurality of stator slots;
    providing a plurality of wire windings;
    exposing a substantially planar surface on the ends of the wire windings;
    forming a plurality of three-dimensional features on the substantially planar surfaces via a deformation process, thereby creating prepared surfaces on the ends of the wire windings;
    inserting the wire windings within the stator slots such that matched pairs of prepared surfaces face each other;
    ultrasonically welding the matched pairs of prepared surfaces to each other;
    wherein exposing the substantially planar surfaces includes removing an enamel layer from the ends of the wire windings.

2. The method of claim 1, wherein the plurality of three-dimensional features comprises linear striations.

3. The method of claim 2, wherein the linear striations include substantially "V"-shaped grooves.

4. The method of claim 1, wherein the plurality of three-dimensional features are knurled structures.

5. The method of claim 4, wherein the knurled structures include generally pyramid-shaped structures.

6. The method of claim 1, wherein the deformation process includes an abrasive process.

7. The method of claim 1, wherein the deformation process includes a stamping process.

8. The method of claim 1, wherein the plurality of three-dimensional structures have an average depth, and wherein the average depth is greater than the average thickness of the weld produced by the ultrasonic welding step.

* * * * *